UNITED STATES PATENT OFFICE.

CARL STEFFEN, OF VIENNA, AUSTRIA-HUNGARY.

PROCESS OF EXTRACTING SUGAR FROM MOLASSES, SIRUPS, OR THE JUICES OF PLANTS, &c.

SPECIFICATION forming part of Letters Patent No. 277,521, dated May 15, 1883.

Application filed March 14, 1883. (No specimens.)

*To all whom it may concern:*

Be it known that I, CARL STEFFEN, of the city of Vienna, in the Empire of Austria, have invented certain new and useful Improvements in Processes for Extracting Sugar from Molasses, Sirups, and the Juices of Plants, (called "separation,") of which the following is a specification.

My invention relates to a process of extracting sugar from molasses, sirups, and the juices of plants, which said process I term "separation;" and it consists in treating an aqueous solution of calcareous saccharate so that calcareous saccharate insoluble at a temperature varying from 0° to 35° centigrade (32° to 95° Fahrenheit) is won without employing artificial warmth or alcohol. The said aqueous solution of calcareous saccharate is previously filtered or decantered, so as to free the same from the superfluous lime, and is then mixed with a certain new quantity of lime, more than equal to thirty and not more than one hundred parts, by weight, to one hundred parts of sugar in the solution. The separation of the calcareous saccharate takes place and contains no excess of lime. This process also produces a separation of the sugar from the impure fluid or lye containing non-saccharine matter by washing in clear pure water.

My said process is carried out in the following manner: An aqueous saccharine solution saturated with lime, but freed from all excess of insoluble lime, is first produced at a temperature varying from 0° to 35° centigrade, or 32° to 95° Fahrenheit. The aforementioned calcareous saccharate is separated or precipitated out of the aqueous calcareous saccharate solution, without the employment of artificial heat or alcohol, by the addition of a fresh quantity of lime. The calcareous saccharate so separated from the solution is not easily soluble in water, and can therefore be readily washed. The proportions of lime added to the solution and the temperature mentioned above must be carefully observed. If any considerable quantity of sugar should still be found in the remaining fluid, liquor, or lye decanted or let off from the calcareous saccharate, this said quantity of sugar is attained by introducing a fresh quantity of lime in the proportions given above and at the temperature as aforenamed—32° to 95° Fahrenheit. The smallest quantity of lime—that is, thirty parts, by weight—is employed when the temperature approaches the freezing-point, the largest quantity—that is, one hundred parts, by weight—when the temperature reaches the maximum temperature of 35° centigrade or 95° Fahrenheit. The lime can be employed in any desired form, either as quicklime (CaO) or in aqueous solution. I prefer, however, to employ powdered quicklime. The concentration of the molasses, sirup, or plant-juice employed can be varied at will. The process of separating out the sugar by introducing fresh quantities of lime is absolutely certain, and never fails, even when the solution of molasses or sirup be very aqueous. It is advisable to avoid too great a concentration, as the filtration of very thick masses is difficult, and the insoluble bodies are not readily separated from the same.

In order to carry my said process into operation, I proceed as follows: The molasses is diluted with cold water in a reservoir provided with stirring apparatus. The temperature of the solution must not exceed 35° centigrade or 95° Fahrenheit, and it is preferable to keep the temperature as low as possible within the limits. It is advisable in practice to employ solutions which are not considerably concentrated—for instance, solutions containing eight to twelve per cent. sugar. The concentration is ascertained by measuring the specific gravity of the solution in the stirring vat or vessel, which said vessel I call the "molasses-mash." From this said stirring-vessel the molasses solution is led into a cylindrical and preferably closed vessel, which is also provided with stirring mechanism. This vessel I term the "mixing vessel or vat." A certain volume of diluted molasses, the amount of sugar in the same being known, is led into the said mixing vat or vessel, which said vessel is in connection with a tourniquet, or apparatus for measuring powdered lime, which said powdered lime is produced in a suitable mill provided with sifting arrangements. The mixing vessel or vat, tourniquet or measuring apparatus, and grinding and sifting arrangements can be constructed and connected with each other similar to the method at present carried out in extracting sugar from molasses. The diluted cold solution of molasses or sirup is introduced into the mixing-vessel, and for every one hundred parts, by weight, of sugar in the said solution is added, according to the quality of the lime, at least fifty parts, but less than one hundred parts, by weight, of powdered lime, in order to form a calcareous saccharine solution. It is advantageous to keep the temperature as low as possible, which said temperature dare on no account exceed 35° centigrade or 95° Fahrenheit. The formation of calcareous saccharine solution takes place in from one to two minutes. The entire mass is now pumped out of the mixing-vessel and pressed through the so-called "lyeing-filters" in order to free the solution from any surplus of undissolved lime. The calcareous saccharine solution or lye escaping from the filter flows into suitable collecting-receptacles and is cooled down to as low a temperature as possible, at least below 35° centigrade, by means of suitable cooling or refrigerating arrangements. This cooling is in most cases necessary, as the solution is liable to become heated to a considerable degree through the addition of the powdered lime. The cooling is carried out either by means of cold water in well-known cooling apparatus or by means of quantities of sugar, passes off as waste liquid, or can be put again through the same operations as described above, and sixty-five parts, by weight, of powdered lime per one hundred parts, by weight, of the sugar in the solution added to the latter. The solution or lye is again passed through the filter-presses, the calcareous saccharate collected, and the resulting fluid, lye, or liquid allowed to run off as waste. In order to remove the liquid still remaining in the calcareous saccharate, the same is lixiviated in filter-presses. The last remaining thin lye can be employed for diluting the molasses in the first operation. The lixiviated calcareous saccharine remaining in the filtering-presses is removed and ground in a wet-mill, (similar in construction to those now employed for grinding similar matter,) together with the juice of beet-roots, a solution of sugar, or water, to a slammy mass, and thoroughly saturated. In factories for beet-root sugar this mass is employed as separating or precipitating matter for raw beet-root juice, is saturated with the same, and employed for manufacturing sugar; or the mass so obtained can be saturated alone and employed for making sugar in the well-known manner.

The separation of the calcareous saccharate duced from molasses, sirups, or the juice of plants, at a temperature ranging from 0° to 35° centigrade, or 32° to 95° Fahrenheit, in quantities within the fixed limits of more than thirty parts, by weight, and less than one hundred parts, by weight, of lime to one hundred parts, by weight, of the sugar contained in the solution, in order to separate the calcareous saccharate from the solution, substantially as set forth in the foregoing specification.

4. The operation of first separating out the sugar from the fluid or lye resulting from the process as claimed above by the introduction of a fresh quantity of lime, exceeding thirty parts and less than one hundred parts, by weight, to one hundred parts of the sugar in the lye, at a temperature of from 0° to 35° centigrade, or 32° to 95° Fahrenheit, without the employment of artificial heat or alcohol, substantially as set forth in the foregoing specification.

CARL STEFFEN.

Witnesses:
EDWIN A. BRYDGES,
ANTHONY STEFFEN.